US012797989B2

(12) United States Patent
Chikaguchi et al.

(10) Patent No.: US 12,797,989 B2
(45) Date of Patent: Nov. 17, 2026

(54) ADDITIVE MANUFACTURING METHOD, ADDITIVE MANUFACTURING DEVICE, AND MODEL DISPLAY DEVICE

(71) Applicant: KOBE STEEL, LTD., Hyogo (JP)

(72) Inventors: Satoshi Chikaguchi, Kobe (JP); Shuo Huang, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 721 days.

(21) Appl. No.: 18/256,367

(22) PCT Filed: Nov. 12, 2021

(86) PCT No.: PCT/JP2021/041730

§ 371 (c)(1),
(2) Date: Jun. 7, 2023

(87) PCT Pub. No.: WO2022/124006

PCT Pub. Date: Jun. 16, 2022

(65) Prior Publication Data

US 2024/0017339 A1 Jan. 18, 2024

(30) Foreign Application Priority Data

Dec. 11, 2020 (JP) ................................ 2020-206079

(51) Int. Cl.
*B23K 9/04* (2006.01)
*B33Y 10/00* (2015.01)
(Continued)

(52) U.S. Cl.
CPC .............. *B23K 9/042* (2013.01); *B33Y 10/00* (2014.12); *B33Y 30/00* (2014.12); *B33Y 50/00* (2014.12)

(58) Field of Classification Search
CPC ......... B33Y 30/00; B33Y 50/00; B33Y 10/00; B23K 9/042
(Continued)

(56) References Cited

U.S. PATENT DOCUMENTS 6,622,062 B1 * 9/2003 Earl ....................... B33Y 50/02 700/193
6,823,230 B1 * 11/2004 Jamalabad ......... G05B 19/4099 700/182
(Continued)

FOREIGN PATENT DOCUMENTS

JP S63-084776 A 4/1988
JP 2018-027558 A 2/2018
(Continued)

OTHER PUBLICATIONS

Extended European Search Report issued in EP 21 90 3110.1-1103 by the European Patent Office on Dec. 4, 2024, which is related to U.S. Appl. No. 18/256,367.

*Primary Examiner* — Jimmy Chou
(74) *Attorney, Agent, or Firm* — Studebaker Brackett PLLC

(57) ABSTRACT

An additive manufacturing method includes dividing a three-dimensional model shape into a plurality of layers, and dividing each divided layer into a plurality of bead models. A trapezoidal bead model has four vertices. The dividing into the plurality of bead models includes, in the same layer, the bead model for a previously formed weld bead and the bead model for a subsequently formed weld bead that is adjacent to the previously formed weld bead are arranged to have an overlapping portion, and among four vertices of the bead model for the subsequently formed weld bead, selecting as a selected vertex the vertex positioned at an end of the bottom line of the bead model, the end being away from the
(Continued)

overlapping portion, and rotating the other three vertices about the selected vertex to change a shape of the trapezoidal bead model.

20 Claims, 17 Drawing Sheets

(51) Int. Cl.
*B33Y 30/00* (2015.01)
*B33Y 50/00* (2015.01)

(58) Field of Classification Search
USPC ........................................................ 219/76.14
See application file for complete search history.

(56) References Cited

U.S. PATENT DOCUMENTS 8,983,643 B2 * 3/2015 Heide .................. B29C 64/106
700/98
2006/0093992 A1 * 5/2006 Wen ...................... A61C 9/002
433/213
2021/0200916 A1 * 7/2021 Roberts .................. G06F 30/17
2022/0072646 A1 * 3/2022 Sato ........................ B23K 9/04
2022/0355407 A1 * 11/2022 Fujii ...................... B33Y 50/00

FOREIGN PATENT DOCUMENTS

JP 6797244 B1 12/2020
WO 2020/129560 A1 6/2020

* cited by examiner

ADDITIVE MANUFACTURING METHOD, ADDITIVE MANUFACTURING DEVICE, AND MODEL DISPLAY DEVICE

TECHNICAL FIELD

The present invention relates to an additive manufacturing method, an additive manufacturing device, and a model display device.

BACKGROUND ART

In recent years, needs for additive manufacturing using a 3D printer as a means of production are increased, and research and development has been carried out toward a practical use of additive manufacturing using metal materials. As a technique for producing a three-dimensional additively-manufactured object using metal materials, for example, there is a method of depositing weld beads in a desired shape, the weld beads being formed by melting and solidifying a filler material (welding wire) using a heat source such as an arc.

There is a common technique of modeling a cross-sectional shape of the weld beads for the purpose of computer-aided design support or automated control when producing such an additively-manufactured object (for example, Patent Literatures 1 and 2).

Patent Literature 1 describes that manufacturing conditions are changed using an elliptical shape bead model such that a difference between a target shape of the additively-manufactured object and a shape predicted from measured value database is equal to or less than an allowable value. Patent Literature 2 describes that a shape of the weld beads of each layer and each step is predicted based on work conditions such as a joint shape, a plate thickness, and a groove angle or width, and an appropriate torch target position for the next layer and the next step is determined based on the predicted bead shape.

CITATION LIST

Patent Literature

Patent Literature 1: JP2018-27558A
Patent Literature 2: JPS63-84776A

SUMMARY OF INVENTION

Technical Problem

However, when depositing the weld beads obtained by melting and solidifying the filler material, various factors such as accumulation of dripping of the molten metal generated during melting, accumulation of heat input, and unevenness of a surface of the solidified weld beads affect the shape of the additively-manufactured object. For example, as shown in FIG. 17, in a case of a deposition plan in which bead models Mo of the same shape are arranged in 4 rows and 4 layers, an outer edge shape of an additively-manufactured object W that is actually produced may not match an outer edge shape of the bead models Mo, as indicated by a solid line.

Therefore, it is considered to finely adjust the shape of the bead model based on formation conditions of the weld beads, but calculation processing becomes complicated, and depending on a scale of an additively-manufactured object, it is not possible to create a deposition plan in a realistic time.

An object of the present invention is to provide a manufacturing method and a manufacturing device for an additively-manufactured object that enables adjustment of a bead model used for creating a deposition plan with simple calculation and enables building of a target shape with high reproducibility, and a model display device.

Solution to Problem

The present invention includes the following constitutions.

(1) An additive manufacturing method for manufacturing an additively-manufactured object by depositing weld beads on a base, the weld beads being formed by melting and solidifying a filler material, the additive manufacturing method comprising:

- a step of reading a three-dimensional shape data of the additively-manufactured object;
- a step of dividing a three-dimensional model shape based on the three-dimensional shape data into a plurality of layers, and dividing each divided layer into a plurality of bead models corresponding to a bead shape of the weld bead; and
- a step of depositing the weld beads by repeating a process of forming the weld bead along the divided bead models from a bottom layer to a top layer of the plurality of layers,
- wherein each of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and
- in the step of dividing into the plurality of bead models,
  - in the same layer, the bead model corresponding to a previously formed weld bead and the bead model corresponding to a subsequently formed weld bead that is adjacent to the previously formed weld bead are arranged so as to have an overlapping portion, and
  - a step of, among four vertices of the bead model for the subsequently formed weld bead, centering on the vertex positioned at an end of the bottom line of the bead model, the end being farther from the overlapping portion, and rotating the other three vertices to change a shape of the bead model for the subsequently formed weld bead is included.

(2) An additive manufacturing device for manufacturing an additively-manufactured object by depositing weld beads on a base, the weld beads being formed by melting and solidifying a filler material, the additive manufacturing device comprising:

- an input unit that reads a three-dimensional shape data of the additively-manufactured object;
- a model setting unit that divides a three-dimensional model shape based on the three-dimensional shape data into a plurality of layers, and divides each divided layer into a plurality of bead models corresponding to a bead shape of the weld bead; and a building unit that deposits the weld bead by repeating a process of forming the weld bead along the divided bead models from a bottom layer to a top layer of the plurality of layers, wherein each of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and the model setting unit arranges the bead model corresponding to a previously formed weld bead and the bead model corresponding to a subsequently formed weld bead that is adjacent to the previously formed weld bead in the same layer so as to have an overlapping portion, and among four vertices of the bead model for the subsequently formed weld bead, the model setting unit centers on the vertex positioned at an end of the bottom line of the bead model, the end being farther from the overlapping portion, and rotates the other three vertices to change a shape of the bead model for the subsequently formed weld bead.

(3) A model display device, comprising:

an input unit, into which information of the bead model set by the model setting unit of the additive manufacturing device according to (2) is input; and a display unit that displays the input information of the bead model.

Advantageous Effects of Invention

In the present invention, a bead model used for creating a deposition plan can be adjusted by simple calculation, and a target shape can be manufactured with high reproducibility.

DESCRIPTION OF EMBODIMENTS

Hereinafter, embodiments of the present invention are described in detail with reference to the drawings.

In an additive manufacturing method in the present invention, a deposition plan is created using a bead model that simulates a weld bead formed by melting and solidifying a filler material, and based on the created deposition plan, the weld bead is formed on a base to produce an additively-manufactured object.

<Additive Manufacturing Device>

Figure 1:
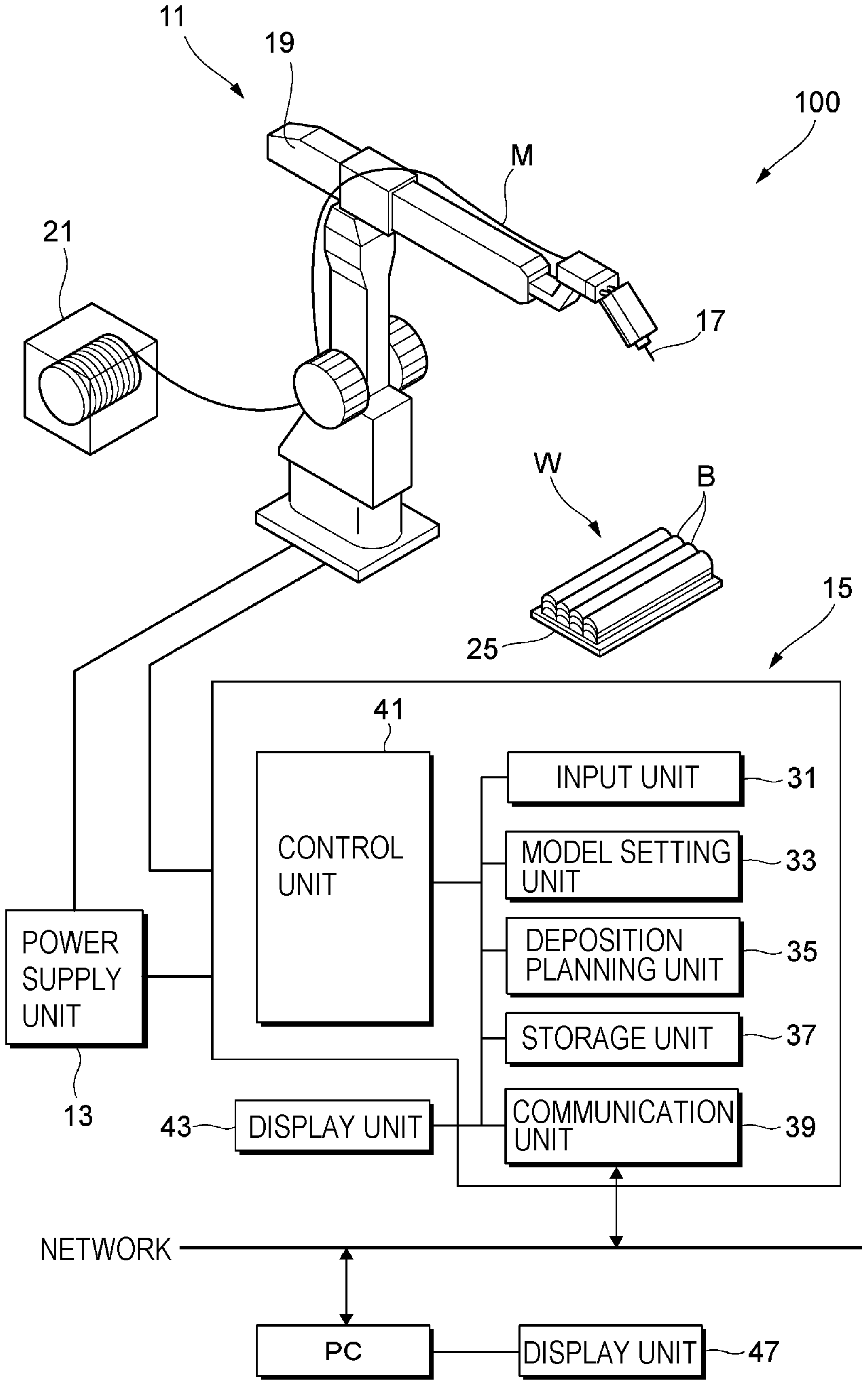
FIG. 1 is a schematic configuration diagram showing an additive manufacturing device.

FIG. 1 is a schematic configuration diagram showing an additive manufacturing device.

An additive manufacturing device 100 is a device for producing an additively-manufactured object or an additively-manufactured object as a blank for obtaining an additively-manufactured object of a desired shape, and includes a building unit 11, a power supply unit 13, and a controller 15 that generally controls the building unit 11 and the power supply unit 13. The additive manufacturing device 100 shown here melts and solidifies a filler material M by an arc to form a weld bead B, and sequentially deposits a plurality of the weld beads B to manufacture an additively-manufactured object W, but the additive manufacturing method is not limited thereto.

The building unit 11 includes a welding robot 19 including a tip shaft having a torch 17, and a filler material supply unit 21 that supplies the filler material (welding wire) M to the torch 17.

The welding robot 19 is an articulated robot, and the torch 17 is supported on the tip shaft of a robot arm such that the filler material M can be continuously supplied. A position and posture of the torch 17 can be set three-dimensionally desirably within a movable range of the robot arm.

While holding the filler material M, the torch 17 generates an arc from a tip of the filler material M in a shielding gas atmosphere. The torch 17 includes a shield nozzle (not shown), and shielding gas is supplied from the shield nozzle. An arc welding method may be a consumable electrode-based method such as shielded metal arc welding method or carbon dioxide gas arc welding method, or a non-consumable electrode-based method such as TIG welding method or plasma arc welding method, and is appropriately selected depending on the additively-manufactured object to be produced.

For example, in the case of the consumable electrode-based method, a contact tip is disposed inside the shield nozzle, and the contact tip holds the filler material M to which a melting current is supplied. While holding the filler material M, the torch 17 generates an arc from the tip of the filler material M in the shielding gas atmosphere. The filler material M is fed from the filler material supply unit 21 to the torch 17 by a delivery mechanism (not shown) attached to the robot arm or the like. Then, when the filler material M fed continuously is melted and solidified while the torch 17 is moved, the linear weld bead B, which is a melt-solidified body of the filler material M, is formed on a base plate 25.

A heat source for melting the filler material M is not limited to the above-described arc. The heat source using another method such as a heating method using both an arc and a laser, a heating method using plasma, or a heating method using an electron beam or a laser may be used. In the case of heating by an electron beam or a laser, a heating amount can be controlled more finely to keep each weld bead in a more proper state, thereby contributing to further improvement in quality of the additively-manufactured object.

Any commercially available welding wire can be used as the filler material M. For example, a wire specified by solid wires for MAG and MIG welding of mild steel, high tensile strength steel, and low temperature service steel (JIS Z 3312), flux-cored wires for arc welding of mild steel, high tensile strength steel, and low temperature service steel (JIS Z 3313), or the like can be used.

The controller 15 includes an input unit 31, a model setting unit 33, a deposition planning unit 35, a storage unit 27, a communication unit 39, and a control unit 41 to which these units are connected. The controller 15 is implemented by a computer device including a CPU, a memory, a storage unit, and the like.

The input unit 31 reads three-dimensional shape data (CAD data or the like) of an additively-manufactured object to be produced. The model setting unit 33 divides a three-dimensional model shape based on the read three-dimensional shape data into a plurality of layers, and generates layer shape data representing a shape of each layer. Then, the generated layer shape data is divided into a plurality of bead models, which is described below.

The deposition planning unit 35 determines a movement trajectory of the torch 17 and various welding conditions for forming the weld bead along the divided bead model. Then, using the determined movement trajectory and welding conditions, a drive program that drives each unit of the building unit 11 and the power supply unit 13 is created. This drive program is stored in the storage unit 37. The building program referred to herein is a command code for causing the building unit 11 and the power supply unit 13 to execute a formation procedure of the weld bead B designed by predetermined calculation from the input three-dimensional shape data of the additively-manufactured object W.

The control unit 41 executes the drive program stored in the storage unit 37 to drive each unit of the welding robot 19, the power supply unit 13, and the like. As a result, the welding robot 19 receives a command from the controller 15 and moves the torch 17 along a trajectory based on the deposition plan. The welding robot 19 melts the filler material M with movement of the torch 17, and supplies the melted filler material M onto the base plate 25. Then, the linear weld bead B is formed on the base plate 25.

Figure 2:
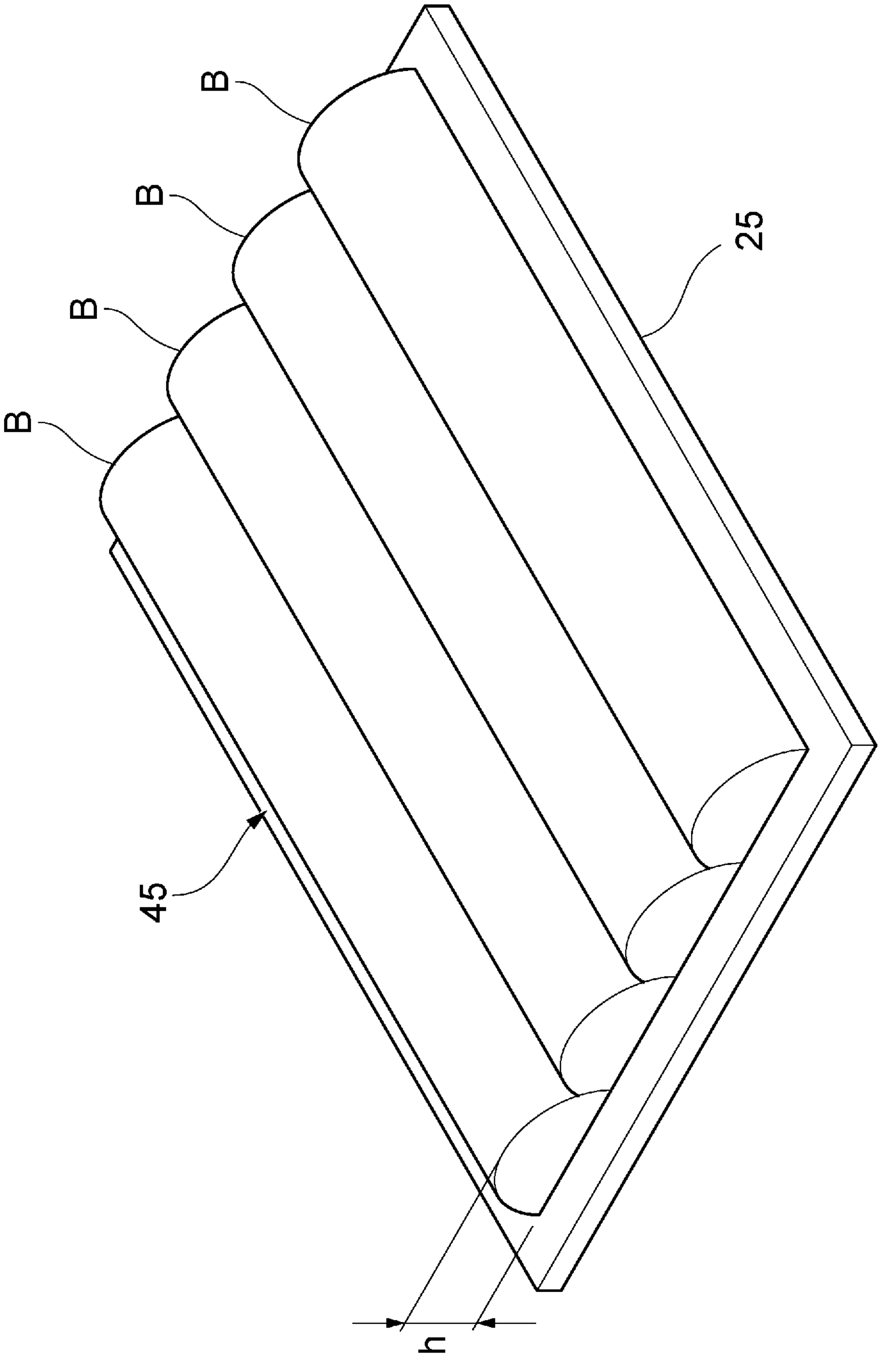
FIG. 2 is a schematic perspective view of an appearance of weld beads formed on a base plate.

FIG. 2 is a schematic perspective view of an appearance of the weld bead B formed on the base plate 25.

As shown in FIG. 2, by repeatedly forming the weld bead B on the base plate 25, a bead layer 45 having a height h in which a plurality of the linear weld beads B are solidified and arranged is formed. FIG. 2 shows the bead layer 45 as an initial layer, and by depositing the bead layer for a plurality of times on the bead layer 45 in the same way, the additively-manufactured object W having a multilayer structure, an example of which is shown in FIG. 1, is manufactured.

Although the base plate 25 is made of a metal plate such as a steel plate, the base plate 25 is not limited to a plate shape, and may be of other shapes such as a block or a bar.

Each calculation unit such as the model setting unit 33 and the deposition planning unit 35, shown in FIG. 1, may be provided at a unit other than the controller 15. For example, an external computer PC such as a server or a terminal, which is connected to the communication unit 39 via a network, may be provided with the above-described calculation unit. When the external computer PC is provided with the above-described calculation units, a desired drive program can be created without using the additive manufacturing device 100, and program creation work is not complicated. By transferring the created drive program to the storage unit 37 in the controller 15, the building unit 11 and the power supply unit 13 can be operated in the same manner as the case where the drive program is created by the controller 15.

Although details are described below, a display unit 43 such as a liquid crystal display may be connected to the controller 15 to provide a function of displaying model information. For example, by displaying information of the bead model set by the model setting unit 33 on a screen of the display unit 43, an operator can easily check various information of the deposition plan or adjust plan contents. In other words, it is possible to support design of the additively-manufactured object. A display unit 47 such as a monitor connected to the external computer PC may have a similar function of displaying information of the bead model and the like. As described above, the additive manufacturing device 100 may have a design support function for the additively-manufactured object, or a device including the display unit 43 may be externally connected to the additive manufacturing device 100.

Figure 3:
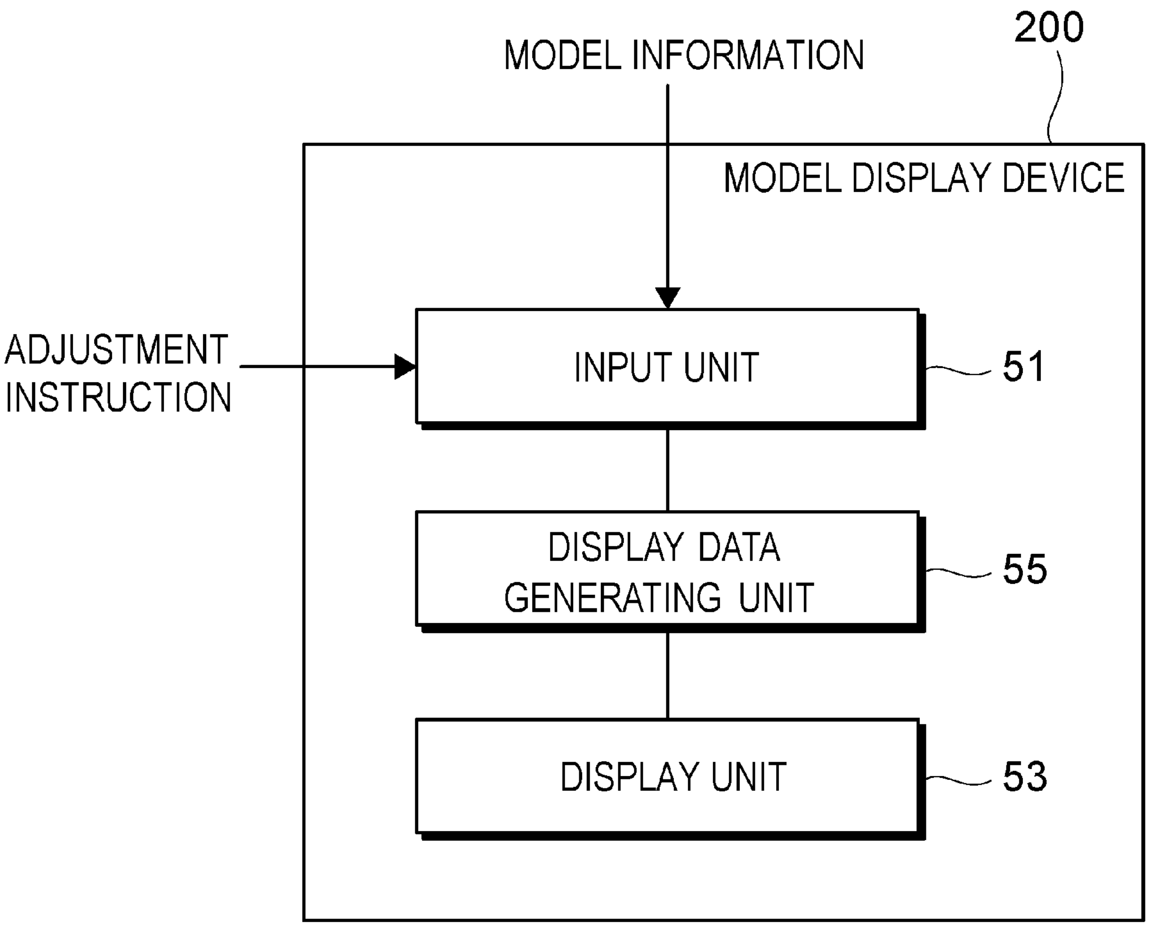
FIG. 3 is a functional block diagram of a display device.

FIG. 3 is a functional block diagram of a model display device 200.

The model display device 200 for supporting the design of the additively-manufactured object includes an input unit 51, into which the information of the bead model set by the model setting unit 33 is input, and a display unit 53 that displays the input information of the bead model. In this way, it is possible to visually check shape and size of the bead model displayed on the display unit 53, or a difference in shape between the bead model and the actual weld bead. A display data generating unit 55 that processes the input information of the bead model and then generates display data may be provided. In this case, the bead model can be reset by the operator inputting an instruction to adjust various conditions to the input unit 51.

<Additive Manufacturing Method>

The above-described additively-manufactured object W is formed by depositing the plurality of weld beads B based on the deposition plan having various conditions such as the formation procedure of the weld beads and the welding conditions. Specifically, the controller 15 or the external computer PC shown in FIG. 1 creates the deposition plan based on the information input by the operator, and generates the drive program based on the created deposition plan. Then, the control unit 41 executes the generated drive program to drive the building unit 11 and the power supply unit 13, thereby producing the additively-manufactured object W having a desired shape based on the deposition plan.

The deposition plan described above includes a process of transforming the shape of the additively-manufactured object W into a collection of bead models showing individual bead shapes of the weld beads B. The bead model is a shape model formed by simulating the weld bead and extending in one direction, and includes position information (information of torch trajectory) and information such as size, length, or cross-sectional shape of each weld bead. The additively-manufactured object W is finally obtained by forming the weld bead B while moving the torch 17 along the bead model.

<Bead Model Setting>

(Model Division)

Figure 4:
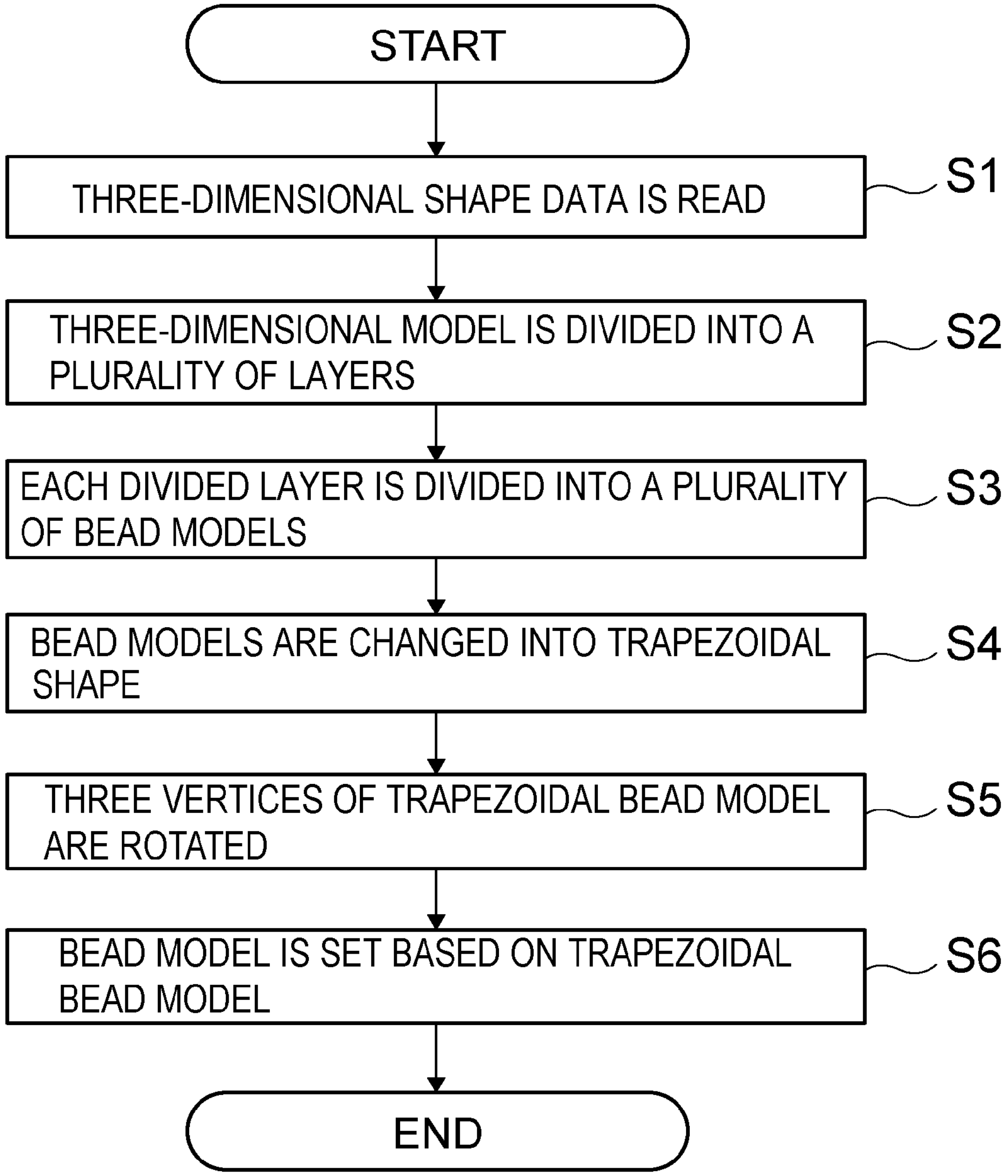
FIG. 4 is a flow chart showing a procedure for setting a bead model based on a shape of an additively-manufactured object.

FIG. 4 is a flow chart showing a procedure for setting the bead model based on the shape of the additively-manufactured object W. FIG. 5A to FIG. 5D are explanatory diagrams schematically showing how the bead model is set.

Figure 5A:
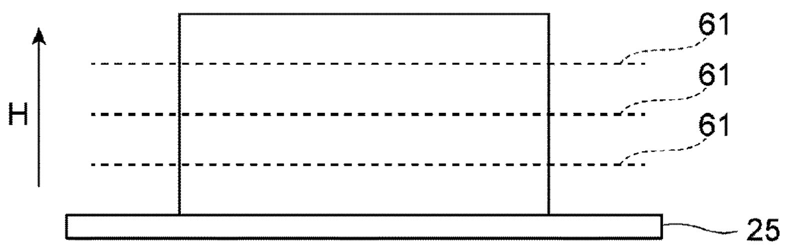
FIG. 5A to FIG. 5D are explanatory diagrams schematically showing how a bead model is set.

First, the three-dimensional shape data (CAD data or the like) indicating the shape of the additively-manufactured object to be manufactured is read (S1). As shown in FIG. 5A, a shape in the read three-dimensional shape data is sliced along planes 61 orthogonal to a deposition direction H of the weld beads and thus divided into a plurality of layers (S2). The dividing method is not particularly limited, and common methods can be adopted.

Figure 5B:
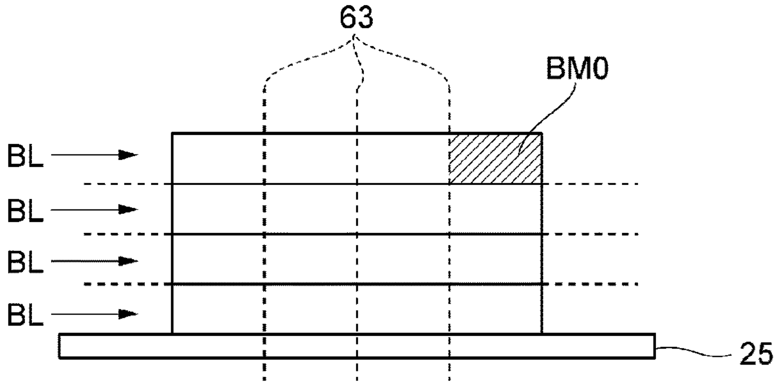
Figure 5C:
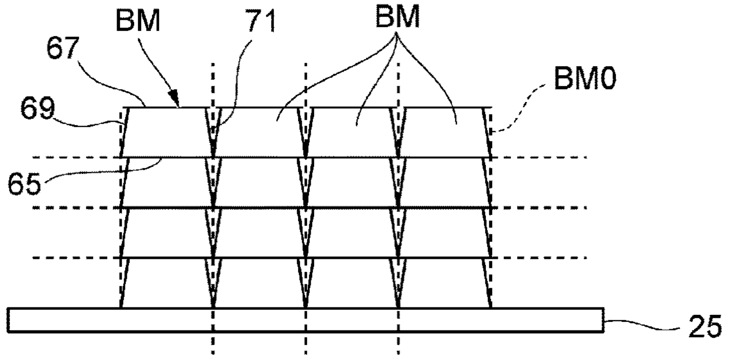

Next, as shown in FIG. 5B, each divided layer BL is divided into a plurality of rectangular bead models BM0 by planes 63 so as to correspond to a bead shape of the weld bead (S3). Each rectangular bead model BM0 shown in FIG. 5B is a linear three-dimensional model that is continuous in a depth direction of the paper of FIG. 5A to FIG. 5D, and in the following description, a rectangular shape in a cross section orthogonal to a longitudinal direction (depth direction of the paper of FIG. 5A to FIG. 5D) in which the rectangular bead model BM0 is continuous is referred to as the rectangular bead model BM0. That is, the process of dividing into the rectangular bead model BM0 described above is performed for all layers by dividing a cross-sectional shape of each layer BL into bead units. In this way, a plurality of rectangular bead models BM0 are arranged for each layer BL. During division of the rectangular bead model BM0, conditions may be specified such that a bead cross-sectional area is made constant in a cross section orthogonal to a bead longitudinal direction for each model.

Then, the plurality of divided rectangular bead models BM0 are modified to fit trapezoids, which are simple geometric figures, to be changed to trapezoidal bead models BM (S4). In a cross section vertical to the bead longitudinal direction, the trapezoidal bead model BM has a trapezoidal shape with four vertices, in which a bottom line 65 arranged on the base plate 25 side and a top line 67 opposite to the bottom line 65 in a bead deposition direction are parallel to each other, and a pair of side lines 69 and 71 opposite to each other in a bead arrangement direction in the layer BL are made non-parallel to each other.

The trapezoidal shape can be set arbitrarily, but when a relation between the welding conditions and the bead shape is managed as a database in advance, the trapezoidal shape may be set by referring to the database. For example, various parameters such as lengths of the bottom line 65, the top line 67, the side lines 69 and 71 of the trapezoid, and angles made between the bottom line 65 and the side lines 69 and 71 are determined as appropriate.

Figure 5D:
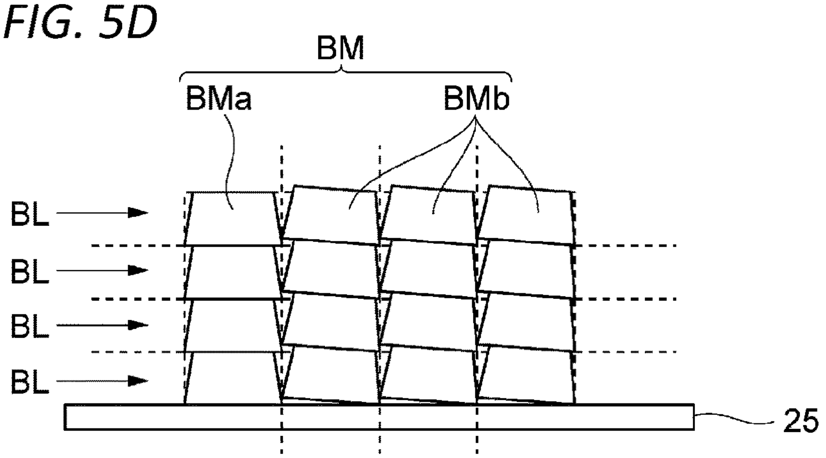

Next, as shown in FIG. 5D, shapes of specific trapezoidal bead models among the plurality of trapezoidal bead models BM are changed (S5). This process modifies each vertex position of the trapezoidal bead model BM corresponding to the weld bead to be formed subsequently in a manufacturing step, in consideration of effects of overlapping between adjacent weld beads.

Figure 6:
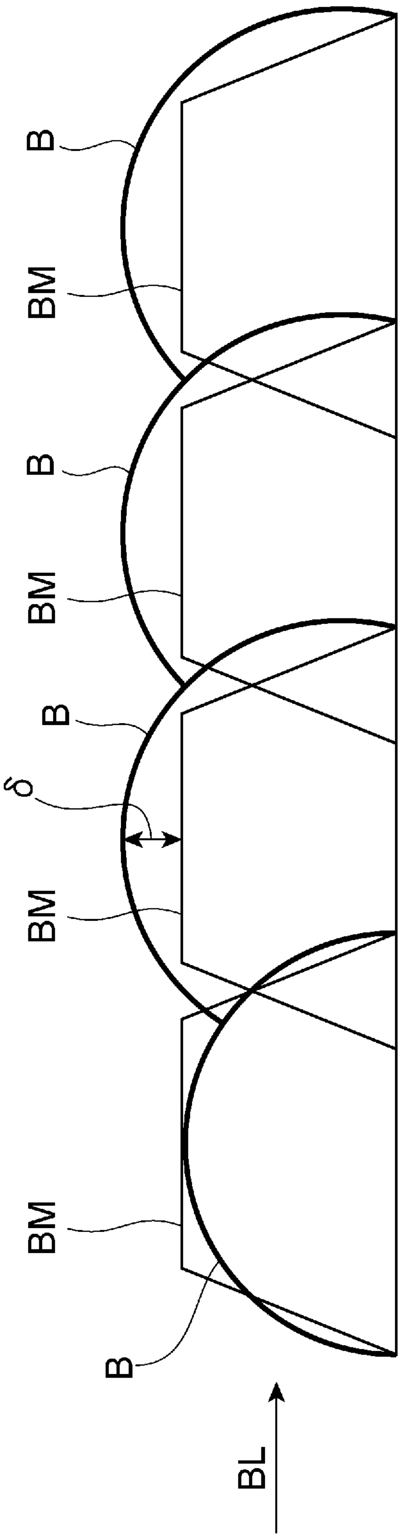
FIG. 6 is an explanatory diagram showing a cross-sectional shape of trapezoidal bead models and a cross-sectional shape of actual weld beads.

FIG. 6 is an explanatory diagram showing a cross-sectional shape of the trapezoidal bead models BM and a cross-sectional shape of the actual weld beads.

As shown in FIG. 6, in a case where the trapezoidal bead models BM having the same shape are simply arranged, when the weld beads B are formed along the trapezoidal bead models BM, depending on situations, it may not be possible to absorb a change in the bead shape due to overlapping between adjacent weld beads. In this case, a difference δ between a surface shape of the weld bead that is actually formed and a shape of the trapezoidal bead model BM may occur, which causes deviation from the target shape of the additively-manufactured body.

Therefore, the shape of the trapezoidal bead model BM is made closer to the shape of the actual weld bead by changing vertex positions of the trapezoidal bead model BM in consideration of the overlapping between adjacent weld beads. Here, since it is assumed that the weld beads are deposited in order from a left side in FIG. 5C, each vertex of the trapezoidal bead model BM on the leftmost side, which is an overlapped side, is not rotated.

(Change in Shape of Trapezoidal Bead Model)

Figure 7:
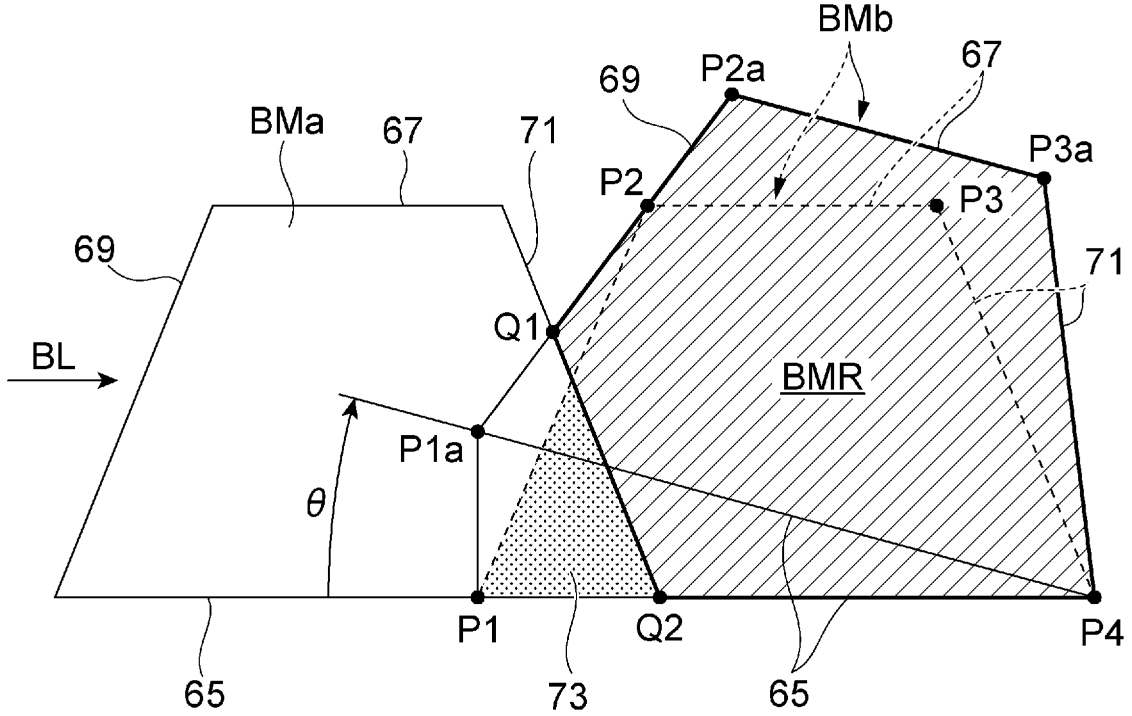
FIG. 7 is an explanatory diagram showing how a shape of a trapezoidal bead model is changed.

FIG. 7 is an explanatory diagram showing how the shape of the trapezoidal bead model BM is changed. In the following description, the same reference numerals are given to the same members and the same parts to omit or simplify the description.

In the plurality of trapezoidal bead models BM that are arranged in the same layer BL shown in FIG. 7, the trapezoidal bead model at a position of the previously formed weld bead is defined as BMa, and the trapezoidal bead model at a position of the subsequently formed weld bead is defined as BMb (indicated by a dotted line). The trapezoidal bead model BMa to be formed previously and the trapezoidal bead model BMb to be formed subsequently are arranged to generate an overlapping portion 73 (indicated by dot hatching).

Here, in the trapezoidal bead model BMb (indicated by the dotted line) to be formed subsequently, a vertex positioned at an end of the bottom line 65 that is closer to the overlapping portion 73 is defined as P1, and a vertex positioned at an end of the bottom line 65 that is farther from the overlapping portion 73 is defined as P4. In a pair of vertices at both ends of the top line 67 of the bead model BMb, the vertex that is closer to the overlapping portion 73 is defined as P2, and the vertex that is farther from the overlapping portion 73 is defined as P3. An intersection point between the side line 69 that is on the overlapping portion 73 side of the bead model BMb and an outer peripheral edge (in this case, the side line 71) of the bead model BMa to be formed previously is defined as Q1. A vertex positioned at an end of the bottom line 65 of the bead model BMa to be formed previously, the end being on the overlapping portion 73 side, is defined as Q2.

Then, the three vertices P1, P2, and P3 other than the vertex P4 of the trapezoidal bead model BMb (indicated by the dotted line) to be formed subsequently are rotated centered on the vertex P4. Here, the trapezoidal bead model BMb is rotated in a direction of θ indicated by an arrow (clockwise direction). Then, the vertex P4, which serves as a center of rotation, remains unchanged, and the vertex P1 becomes a vertex P1*a*, the vertex P2 becomes a vertex P2*a*, and the vertex P3 becomes a vertex P3*a*. That is, the trapezoidal bead model BMb after rotation moves while maintaining relative positions between the four vertices P1, P2*a*, P3*a*, and P4*a* unchanged before and after the rotation, so that the trapezoidal bead model BMb has the same shape as that before the rotation.

The rotation operation of the trapezoidal bead model BMb described above is described in more detail.

Figure 8:
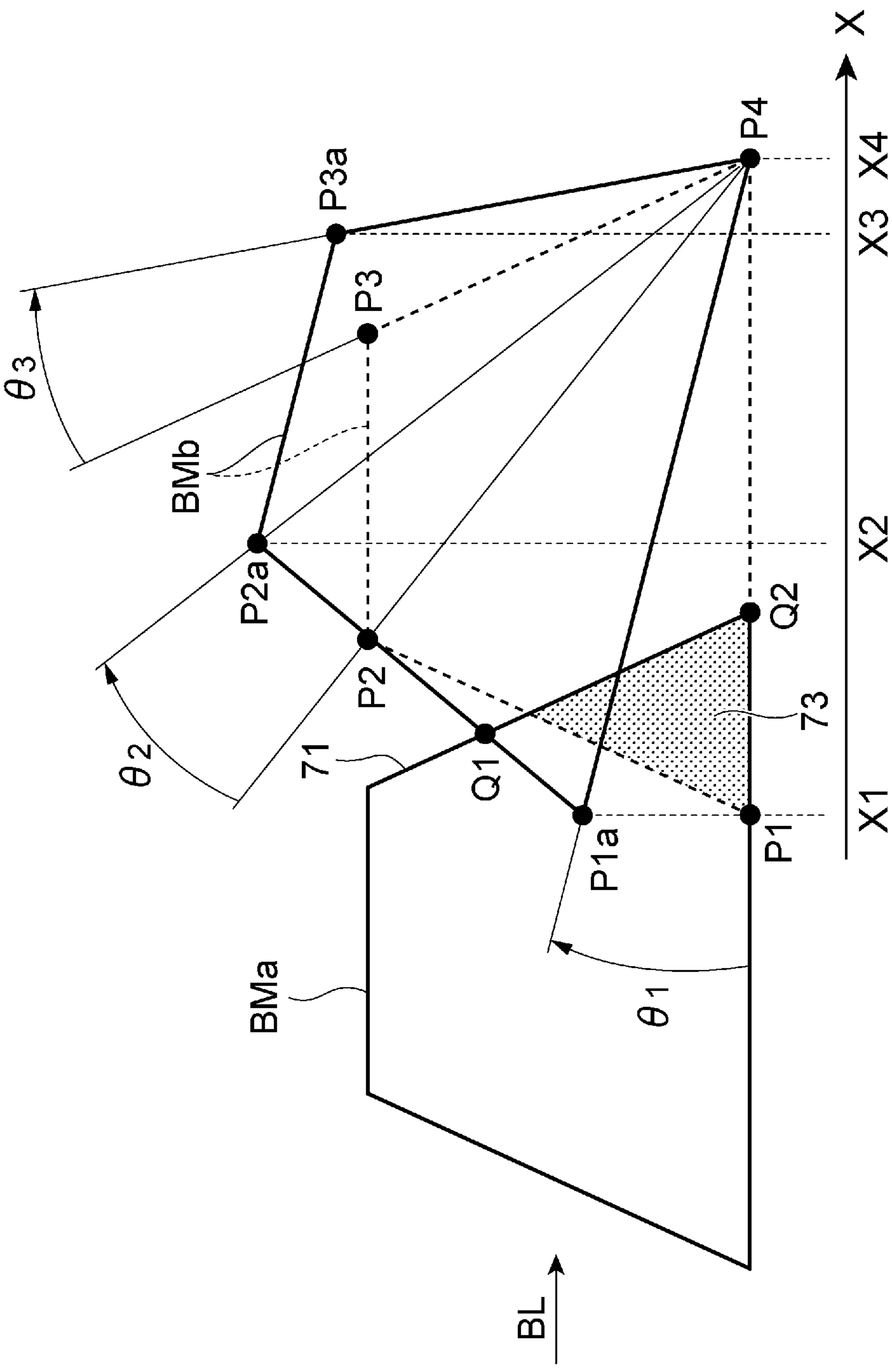
FIG. 8 is an explanatory diagram showing details of a rotation operation of the trapezoidal bead model shown in FIG. 7.

FIG. 8 is an explanatory diagram showing details of the rotation operation of the trapezoidal bead model BMb shown in FIG. 7.

Although FIG. 7 shows an example in which the trapezoidal bead model BMa is rotated while the shape of the trapezoidal bead model BMa is kept unchanged, the present invention is not limited thereto, and the trapezoidal shape may be changed. As shown in FIG. 8, the vertex P1 of the trapezoidal bead model BMb (indicated by the dotted line) to be formed subsequently is rotated at an angle θ1 centered on the vertex P4 to become the vertex P1*a*, and similarly, the vertex P2 is rotated at an angle θ2 to become the vertex P2*a*, and the vertex P3 is rotated at an angle θ3 to become the vertex P3*a*. The angle θj (j=1, 2, 3) for rotating each vertex Pi (i=1, 2, 3) can be set depending on a radial distance xk (k=1, 2, 3) from the vertex P4, which is the center of rotation. The radial distance X4 of the vertex P4 is zero.

A condition may be added to the rotation of each vertex Pi such that the bead model BMb after rotation has the same cross-sectional area as the trapezoidal bead model BMb before deformation. The trapezoidal bead models BMa and BMb set in this manner are set as bead models for deposition planning to create a deposition plan (S6).

FIGS. 7 and 8 show the trapezoidal bead model BMb adjacent to the trapezoidal bead model BMa and the bead model used in the deposition plan, but as shown in FIG. 5D, a plurality of trapezoidal bead models BMb may be repeatedly arranged. By setting these trapezoidal bead models BMb to have the same shape, the bead model setting is easy. The shape of the trapezoidal bead model BMb may be appropriately changed by changing an amount of rotation of the vertex Pi according to an arrangement position of the model.

<Modification 1 of Bead Model for Deposition Planning>

Next, from the trapezoidal bead model BMb obtained by rotating each vertex Pi as described above, a bead model for deposition planning which has a shape closer to the actual weld bead is described.

Instead of the trapezoidal bead model BMb with four vertices, the bead model for deposition planning set here is a pentagonal model indicated by hatching within a thick line in FIG. 7. That is, a region with five vertices, the region being surrounded by the vertex Q2, the intersection point Q1, the vertex P2*a*, the vertex P3*a*, and the vertex P4, is set as a bead model BMR used in the deposition plan.

The trapezoidal bead model BMa corresponding to the weld bead to be formed first in the same layer BL is used in the bead model BMR used for the deposition plan with its shape unchanged.

Each bead model BMR may be set to have a cross-sectional area equal to that of the trapezoidal bead models BMa and BMb before deformation. That is, the cross-sectional area of the trapezoidal bead model BMb including the vertices P1, P2, P3, and P4 shown in FIG. 7 is made equal to the cross-sectional area of the pentagonal bead model BMR including the vertex Q2, the intersection point Q1, and the vertices P2*a*, P3*a*, and P4.

When the bead model BMR is used as the bead model for deposition planning, the adjacent bead model BMR is arranged along the side line 71 of the trapezoidal bead model BMa corresponding to the previously formed weld bead. Therefore, there is no overlapping portion between the two models, and a more accurate deposition plan can be created.

(Method for Setting Amount of Rotation of Each Vertex)

The angle θj (J=1, 2, 3) for the rotation of the vertex Pi shown in FIG. 8 described above can be set according to the welding conditions of the weld bead and the formation trajectory of the weld bead. It may also be different for each vertex. Examples of the welding conditions include a welding method such as a cold metal transfer (CMT) method, a pulsed arc method, or a constant voltage (CV) welding method, a welding current, a welding voltage, and a filler material supply speed or a travel speed. Examples of the formation trajectory include straight trajectories, curved trajectories, upward trajectories and downward trajectories. The angle θj may be set using a function of the radial distance xk. In this case, a coefficient of each function is fitted so as to match a shape of the additively-manufactured object obtained experimentally in advance.

Figure 9:
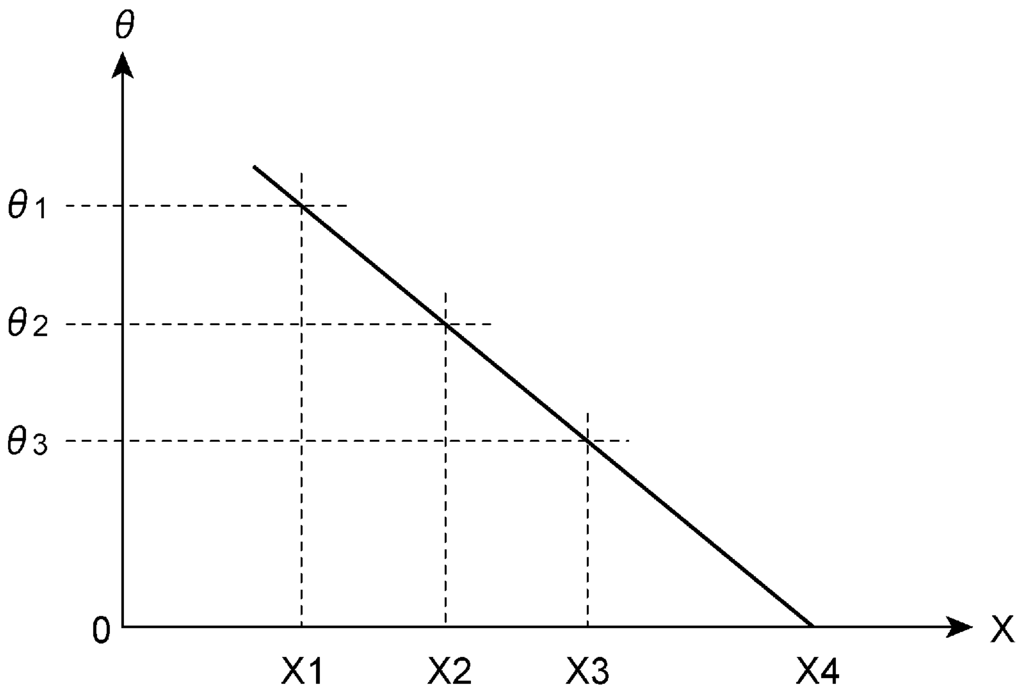
FIG. 9 is a graph showing a relation between a radial distance x and an angle θ in a linear function.

FIG. 9 is a graph showing a relation between the radial distance x and the angle θ in a linear function. The linear function is represented by, for example, θ=ax+b, and coefficients a and b are appropriately set. The angle θ in this case changes linearly according to the radial distance of each of the vertices P1, P2, and P3 from the vertex P4, and the closer to the vertex P4 it is, the smaller the angle θ is.

Various functions can be used for setting the angle θ described above, and it is not limited to the linear function described above.

Figure 10A:
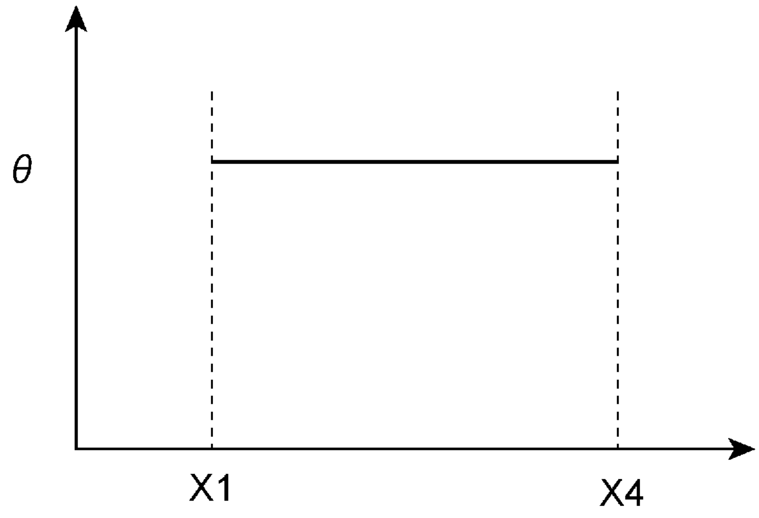
FIG. 10A is a graph showing the relation between the radial distance x and the angle θ in a zero-order function.
Figure 10B:
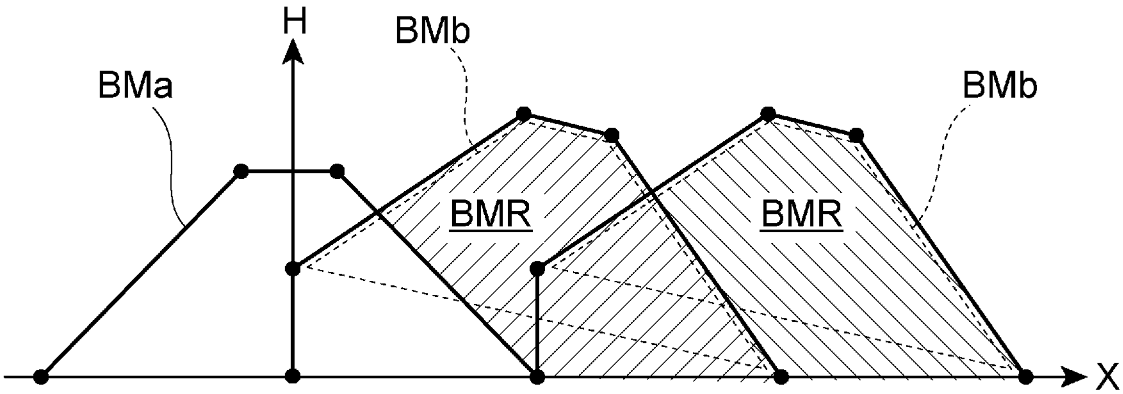
FIG. 10B is an explanatory diagram schematically showing a shape of a bead model when the angle θ is determined using the function shown in FIG. 10A.

FIG. 10A is a graph showing the relation between the radial distance x and the angle θ in a zero-order function, and FIG. 10B is an explanatory diagram schematically showing the shape of the bead model when the angle θ is determined using the function shown in FIG. 10A.

In this case, the angle θ is constant for each of the vertices P1, P2, and P3, and each trapezoidal bead model BMb (indicated by the dotted line) including the four vertices is congruent with each other. Each bead model BMR with five vertices has a shape indicated by hatching.

Figure 11A:
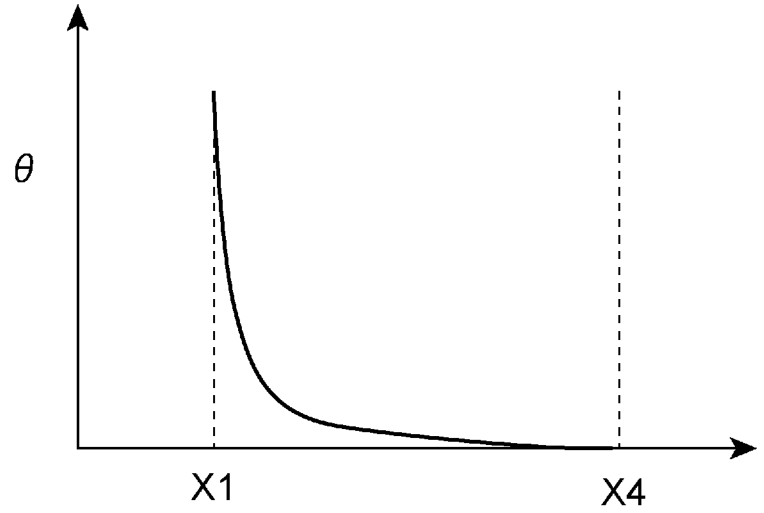
FIG. 11A is a graph showing the relation between the radial distance x and the angle θ in a cubic function.
Figure 11B:
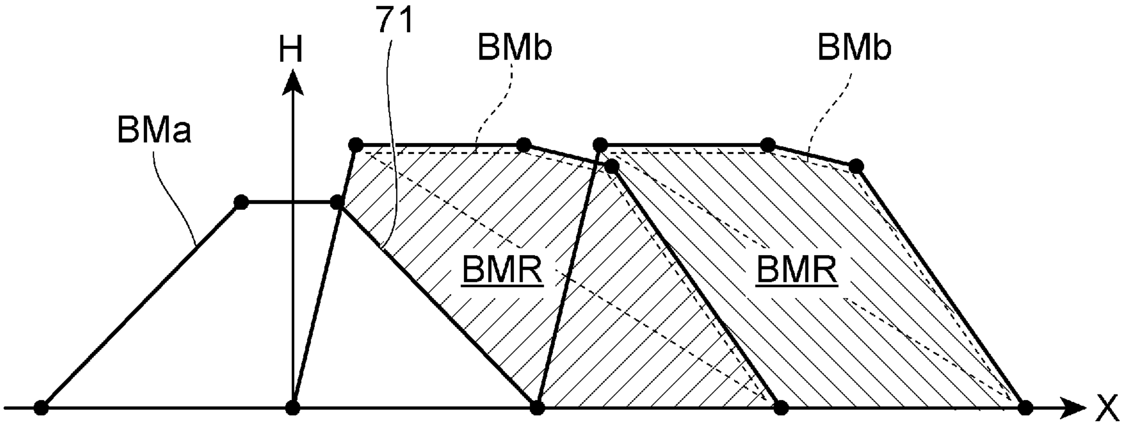
FIG. 11B is an explanatory diagram schematically showing a shape of a bead model when the angle θ is determined using the function shown in FIG. 11A.

FIG. 11A is a graph showing the relation between the radial distance x and the angle θ in a cubic function, and FIG. 11B is an explanatory diagram schematically showing the shape of the bead model when the angle θ is determined using the function shown in FIG. 11A. The cubic function is, for example, $\theta=cx^3+dx^2+e+f$, and coefficients c, d, e, and f are appropriately set.

In this case, the angle θ abruptly increases near the radial distance x1 of the vertex P1. Therefore, the vertex P1 of the trapezoidal bead model BMb is lifted beyond the side line 71 of the adjacent trapezoidal bead model BMa, and as a result, the shape of the bead model becomes closer to the shape of the actual weld bead.

Figure 12:
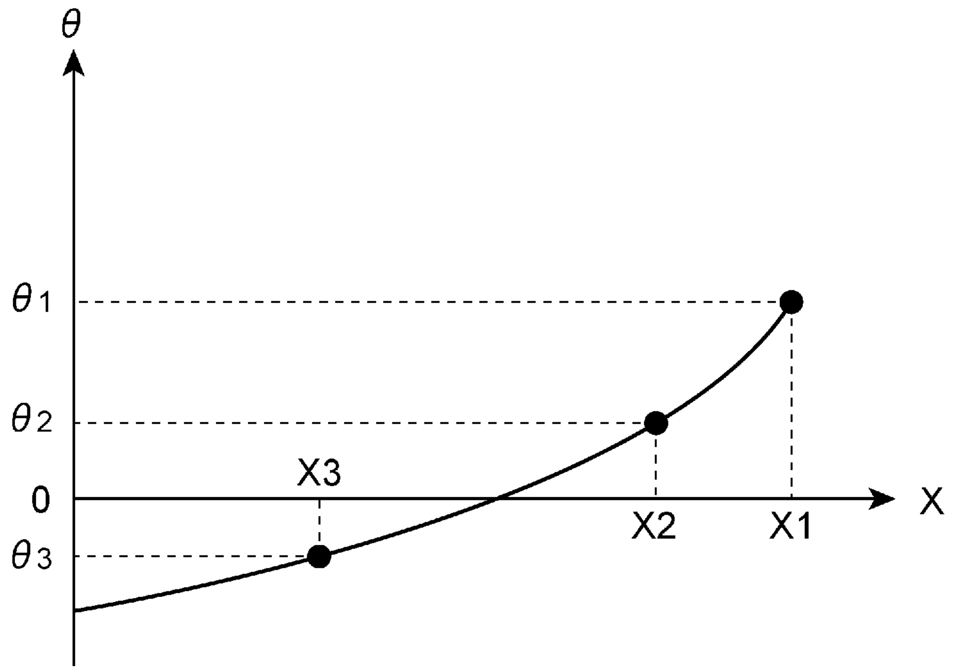
FIG. 12 is a graph showing the relation between the radial distance x and the angle θ in an nth order function.

FIG. 12 is a graph showing the relation between the radial distance x and the angle θ in an nth order function (n is 1.5 or 2, for example). The nth order function is, for example, $\theta=gx^n+h$, and coefficients g and h are appropriately set. In this case, the polarities (rotational directions) for the angles θ1, θ2 are opposite to that of the angle θ3.

Figure 13:
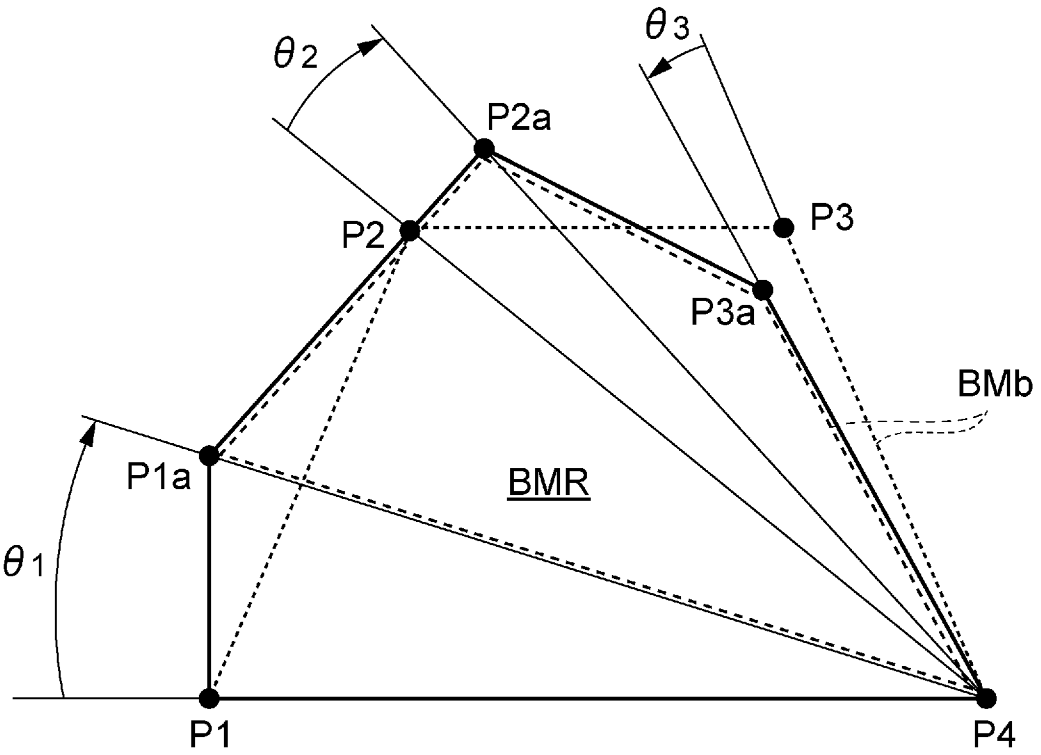
FIG. 13 is an explanatory diagram showing a shape of a bead model when the angle θ is determined using the nth order function shown in FIG. 12.

FIG. 13 is an explanatory diagram showing the shape of the bead model when the angle θ is determined using the nth order function shown in FIG. 12.

As shown in FIG. 13, the vertices P1 and P2 of the trapezoidal bead model BMb rotate clockwise centered on the vertex P4, while the vertex P3 rotates counterclockwise. By varying such a rotational direction according to the vertex, the degree of freedom in setting the shape of the bead model BMR is increased, and the bead model BMR can be made closer to the shape of the actual weld bead. A similar effect can be obtained when using the trapezoidal bead model BMb.

Figure 14:
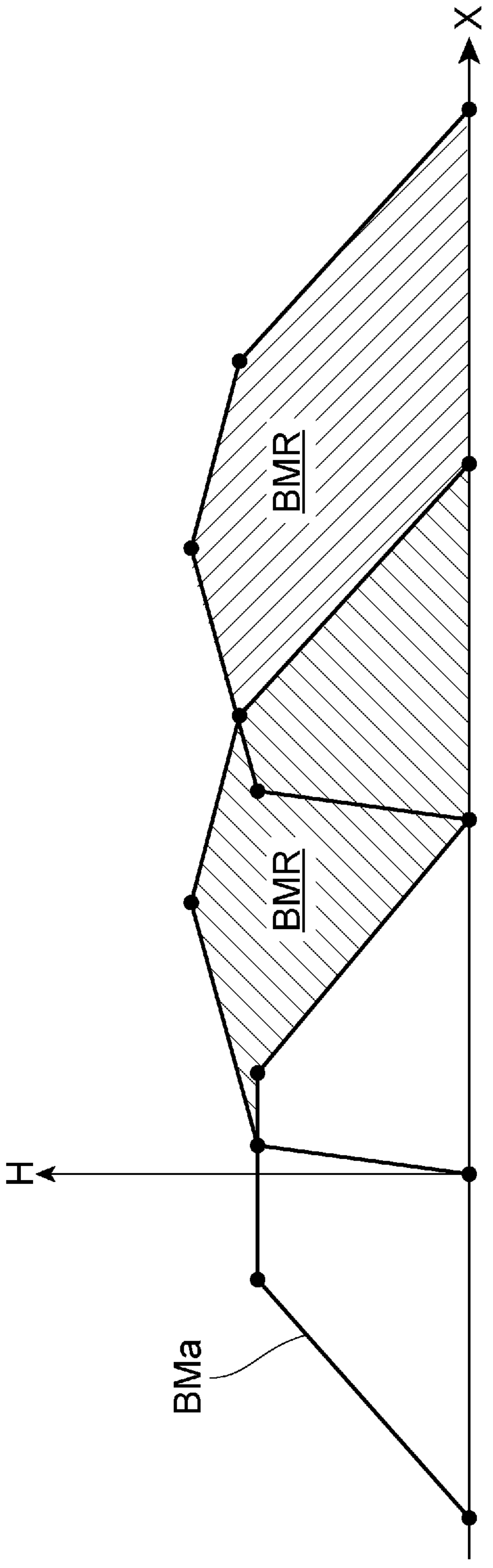
FIG. 14 is an explanatory diagram showing a state where the bead model shown in FIG. 13 is arranged side by side with a trapezoidal bead model.

FIG. 14 is an explanatory diagram showing a state where the bead model BMR shown in FIG. 13 is arranged side by side with the trapezoidal bead model BMa.

As shown in FIG. 14, by adjusting the order and coefficient of the nth order function representing the relation between the radial distance x and the angle θ, a degree of approximation to the shape of the actual weld bead can be further improved.

In the additive manufacturing method described above, the shape of the bead model can be easily adjusted by simple calculation of rotating each vertex of the trapezoidal bead model. By setting the rotation angle for rotating the three vertices based on the welding conditions or formation trajectory of the weld bead, the shape of the bead model can be made more appropriate according to the position and deposition pattern of the weld bead. Even if the weld bead has a complicated shape that cannot be represented by simple rotation of a trapezoid, the complicated shape can be easily reproduced by varying the rotation angle of rotation for each vertex. In this way, an additively-manufactured object having a shape closer to the target shape can be easily produced.

Furthermore, when the rotation angles for rotating the three vertices are set based on a predetermined arithmetic expression, the bead model can be more closely approximated to the shape of the actual weld bead by adjusting coefficients in the arithmetic expression.

When deposition planning is performed using the bead model BMR with five vertices based on the rotated trapezoidal bead model, the shape of the weld bead formed adjacent to an existing weld bead can be more faithfully reproduced. That is, when a bead is formed adjacent to an existing weld bead, the cross-sectional shape of the weld bead is closer to a parallelogram than to a trapezoid. Even in such a case, by fitting with the bead model BMR with five vertices, the model can be well approximated to the shape of the actual weld bead.

<Modification 2 of Bead Model for Deposition Planning>

When a fresh weld bead is formed on a lower layer weld bead during formation of the weld beads, the upper layer weld bead may include a portion that drips toward the lower layer. When a portion of the weld bead drips downward, the dripping reduces a build-up height of the weld bead. Therefore, a build-up height of the actual weld bead tends to be lower than a planned height. Therefore, it is preferable to generate a bead model in consideration of the dripping of the weld bead at the stage of deposition planning.

Figure 15:
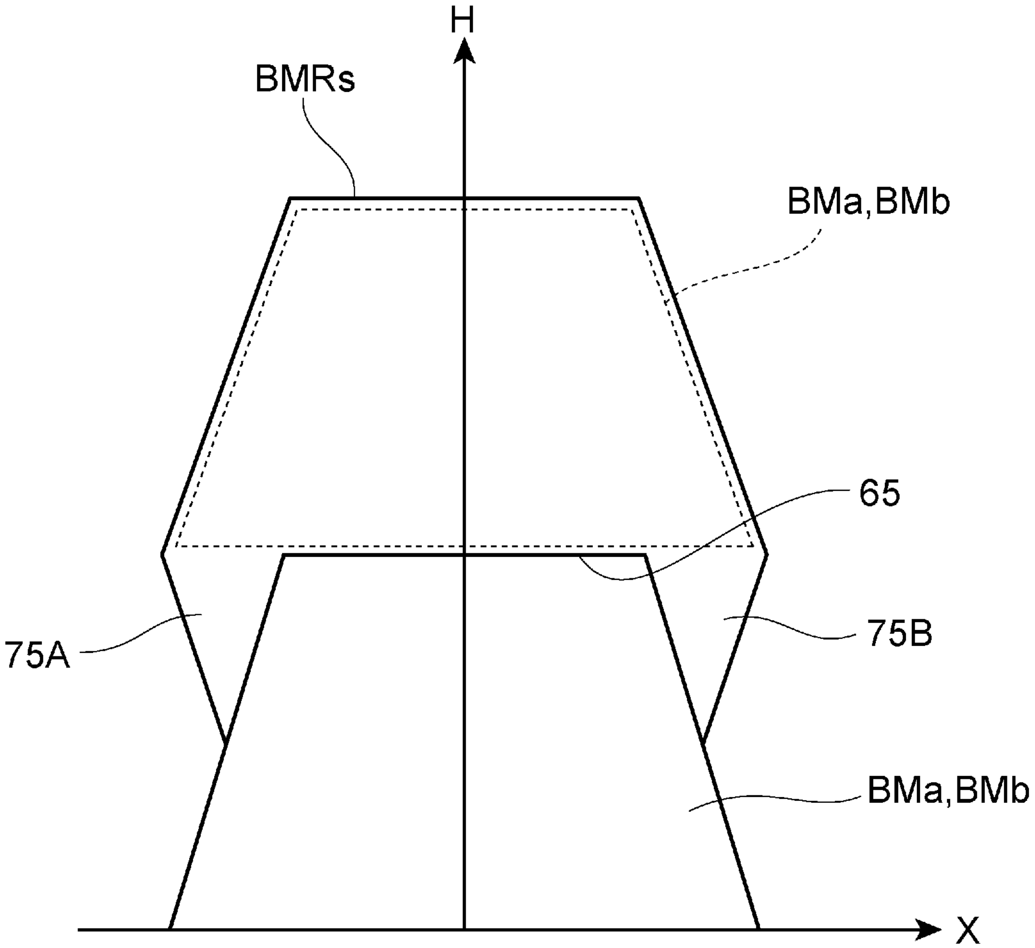
FIG. 15 is an explanatory diagram showing a bead model in consideration of dripping of the weld bead.

FIG. 15 is an explanatory diagram showing a bead model BMRs in consideration of the dripping of the weld bead.

In the deposited trapezoidal bead models BMa and BMb, the upper layer trapezoidal bead models BMa and BMb are changed to bead models BMRs by adding dripping portions 75A and 75B that extend downwardly to the ends of the bottom line 65. The dripping portions 75A and 75B are both triangular with the end of the bottom line 65 as one side, and shape and area thereof are set based on the welding conditions and formation trajectory of the weld bead described above. The dripping portion 75A and the dripping portion 75B may have the same shape, or may have different shapes. The pair of dripping portions 75A and 75B may be provided only at one end of the bottom line 65 of the trapezoidal bead models BMa and BMb.

By setting the bead model BMRs having the dripping portions 75A and 75B as the bead model for deposition planning, a bead height of the weld bead is less likely to be affected by the dripping of the weld bead. Therefore, the additively-manufactured object to be produced can be made closer to the shape as in the deposition plan. Since the shapes of the dripping portions 75A and 75B are simple triangles, a calculation load can be reduced.

Figure 16A:
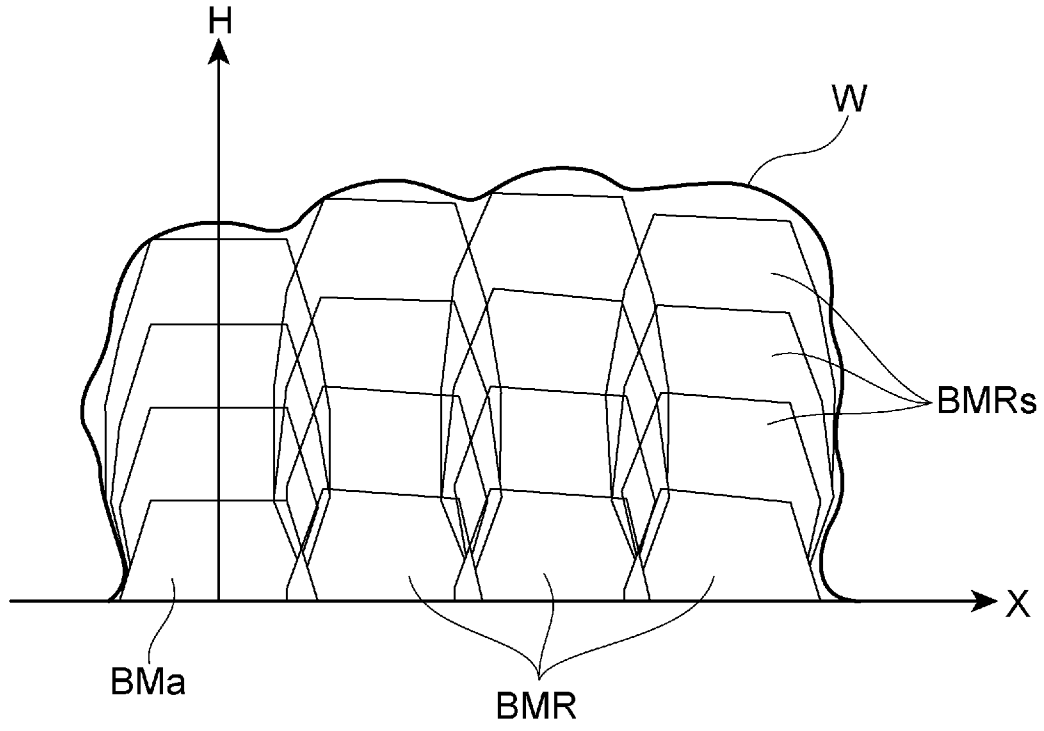
FIG. 16A and FIG. 16B are both schematic diagrams showing a bead model in consideration of dripping of the weld bead and an outer edge shape of an additively manufactured object produced by a deposition plan using the bead model.
Figure 16B:
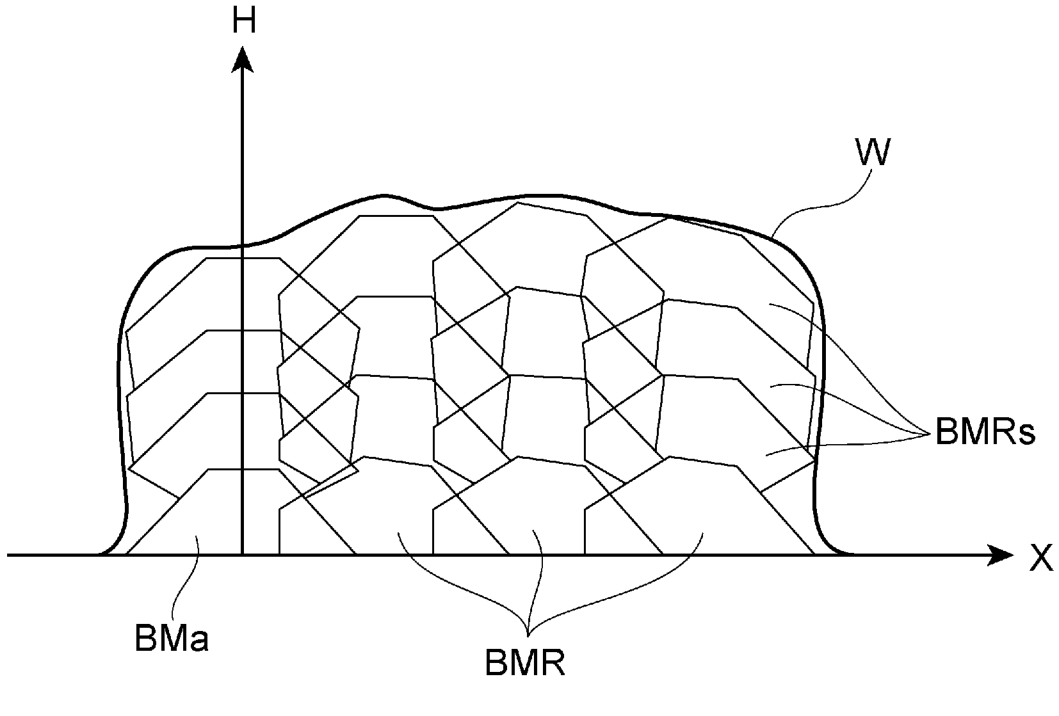
Figure 17:
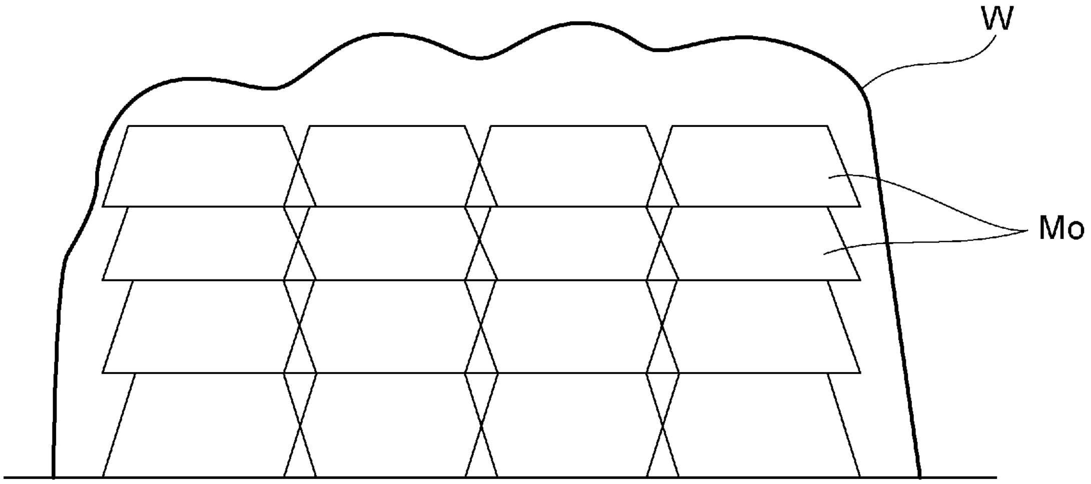
FIG. 17 is an explanatory diagram showing a bead model created by a deposition plan in related art and an outer edge shape of an additively-manufactured object.

FIG. 16A and FIG. 16B are both schematic diagrams showing the bead model BMRs in consideration of dripping of the weld bead and an outer edge shape of the additively-manufactured object W produced in accordance with a deposition plan using the bead model BMRs. FIG. 16B shows a result obtained by increasing the filler material supply speed and the travel speed as compared with the case in FIG. 16A. In either case, the additively-manufactured object W having a shape close to the bead model in the deposition plan can be manufactured.

<Support for Creation of Deposition Plan with Display Device>

In the deposition plan using the various bead models described above, by repeating the modeling of the target shape and the correction of the model, the shape of the additively-manufactured object can be further approximated to the target shape.

The model display device 200 shown in FIG. 3 displays the shape of the bead model as shown in, for example, FIG. 10B, FIG. 11B, FIG. 14, FIG. 16A or FIG. 16B on the display unit 53, so that the operator can easily check whether the modeling is appropriate, and the operator can be easily urged to correct the model. When the model needs to be corrected, the operator can input adjustment instruction information through the input unit 51 to reset the bead model.

Specifically, by displaying each bead model and the shape of the additively-manufactured object W shown in FIG. 16A and FIG. 16B on the display unit 53 and comparing the two, it is possible to check whether the degree of approximation to the target shape is sufficient. When the information of the adjustment instruction is input and the shape of the bead model is further changed, it is possible to visually check whether the changed content is appropriate. In this way, since the contents of the deposition plan can be easily checked, workability for the deposition plan can be improved. When the model display device 200 is attached to the additive manufacturing device 100, for example, the above-described check can be easily performed even immediately before the building, so that the workability of the additive manufacturing can be improved.

As described above, the present invention is not limited to the above-described embodiments, and combinations of the respective configurations of the embodiments and changes and applications made by those skilled in the art based on the description and common techniques are also intended for the present invention and are included in the scope of protection.

As described above, the present description discloses the following matters.

(1) An additive manufacturing method for manufacturing an additively-manufactured object by depositing weld beads on a base, the weld beads being formed by melting and solidifying a filler material, the additive manufacturing method comprising:

a step of reading a three-dimensional shape data of the additively-manufactured object;

a step of dividing a three-dimensional model shape based on the three-dimensional shape data into a plurality of layers, and dividing each divided layer into a plurality of bead models corresponding to a bead shape of the weld bead; and a step of depositing the weld beads by repeating a process of forming the weld bead along the divided bead models from a bottom layer to a top layer of the plurality of layers, wherein each of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and in the step of dividing into the plurality of bead models, in the same layer, the bead model corresponding to a previously formed weld bead and the bead model corresponding to a subsequently formed weld bead that is adjacent to the previously formed weld bead are arranged so as to have an overlapping portion, and a step of, among four vertices of the bead model for the subsequently formed weld bead, centering on the vertex positioned at an end of the bottom line of the bead model, the end being farther from the overlapping portion, and rotating the other three vertices to change a shape of the bead model for the subsequently formed weld bead is included.

By this additive manufacturing method, the shape of the bead model can be easily adjusted by simple calculation of rotating each vertex of the trapezoidal bead model. In this way, an additively-manufactured object having a shape closer to the target shape can be produced.

(2) The additive manufacturing method according to (1), wherein rotation angles for rotating the other three vertices are set based on a welding condition of the weld bead or a formation trajectory of the weld bead.

By this additive manufacturing method, the shape of the bead model can be set to a more appropriate shape based on the position of the weld bead and the deposition pattern.

(3) The additive manufacturing method according to (1) or (2), wherein rotation angles for rotating the other three vertices are made different for each of the vertices.

By this additive manufacturing method, even if the weld bead has a complicated shape that cannot be represented by simple rotation of a trapezoid, the complicated shape can be easily reproduced.

(4) The additive manufacturing method according to any one of (1) to (3), wherein rotation angles for rotating the other three vertices are set based on a predetermined arithmetic expression.

By this additive manufacturing method, the bead model can be approximated to the shape of the actual weld bead by adjusting the coefficients in the arithmetic expression.

(5) The additive manufacturing method according to (4), wherein the arithmetic expression is a linear or curved relational expression in which a coordinate value along the bottom line of the bead model is variable.

By this additive manufacturing method, the amount of rotation can be set based on the radial distance from one vertex serving as the center of rotation.

(6) The additive manufacturing method according to any one of (1) to (5), wherein instead of the trapezoidal shape, the bead model for the subsequently formed weld bead is set to a shape with five vertices, the five vertices including:

the vertex positioned at the end of the bottom line of the bead model for the subsequently formed weld bead, the end being farther from the overlapping portion, a pair of vertices positioned at both ends of the top line of the bead model for the subsequently formed weld bead, an intersection point between the side line of the bead model for the subsequently formed weld bead on the overlapping portion side and an outer peripheral edge of the bead model for the previously formed weld bead, and a vertex positioned at an end of a bottom line of the bead model for the previously formed weld bead on the overlapping portion side.

By this additive manufacturing method, even in a case of a weld bead that is closer to a parallelogram than a trapezoid, such as a weld bead formed adjacent to an existing weld bead, a good shape fitting can be achieved.

(7) The additive manufacturing method according to any one of (1) to (5), wherein a dripping portion that is a downward dripping of a melt of the filler material is provided at one end or both ends of the bottom line of the bead model that is arranged on an upper layer than the bead model arranged on the lowest layer.

In this additive manufacturing method, by providing the dripping portion in the bead model, the bead height of the weld bead is less likely to be affected by the dripping of the weld bead. Therefore, the shape of the additively-manufactured object produced can be approximated to the shape as in the deposition plan.

(8) The additive manufacturing method according to (7), wherein the dripping portion is triangular.

In this additive manufacturing method, the calculation load can be reduced by using a simple triangle as the shape of the dripping portion.

(9) An additive manufacturing device for manufacturing an additively-manufactured object by depositing weld beads on a base, the weld beads being formed by melting and solidifying a filler material, the additive manufacturing device comprising:

an input unit that reads a three-dimensional shape data of the additively-manufactured object;

a model setting unit that divides a three-dimensional model shape based on the three-dimensional shape data into a plurality of layers, and divides each divided layer into a plurality of bead models corresponding to a bead shape of the weld bead; and a building unit that deposits the weld bead by repeating a process of forming the weld bead along the divided bead models from a bottom layer to a top layer of the plurality of layers, wherein each of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and the model setting unit arranges the bead model corresponding to a previously formed weld bead and the bead model corresponding to a subsequently formed weld bead that is adjacent to the previously formed weld bead in the same layer so as to have an overlapping portion, and among four vertices of the bead model for the subsequently formed weld bead, the model setting unit centers on the vertex positioned at an end of the bottom line of the bead model, the end being farther from the overlapping portion, and rotates the other three vertices to change a shape of the bead model for the subsequently formed weld bead.

In this additive manufacturing device, the shape of the bead model can be easily adjusted by simple calculation of rotating each vertex of the trapezoidal bead model. In this way, an additively-manufactured object having a shape closer to the target shape can be produced.

(10) The additive manufacturing device according to (9), further comprising: a display unit that displays information of the bead model whose shape is changed by the model setting unit.

In this additive manufacturing device, by displaying the shape of the bead model or the like on the display unit, it is possible to easily check whether the shape is close to the shape obtained by actually producing the additively-manufactured object before manufacturing.

(11) A model display device, comprising:

an input unit, into which information of the bead model set by the model setting unit of the additive manufacturing device according to (9) is input; and a display unit that displays the input information of the bead model.

In this model display device, by displaying the shape of the bead model or the like on the display unit, the operator can easily check whether the modeling is appropriate, and the operator can be easily urged to correct the model.

(12) The model display device according to (11), further comprising:

a display data generating unit that receives information of an adjustment instruction for the bead model from the input unit, adjusts the bead model based on the received information of the adjustment instruction, and outputs display data of the adjusted bead model to the display unit.

By this model display device, the result obtained by adjustment of the bead model by the operator can be displayed, which enhances convenience.

The present application is based on Japanese Patent Application No. 2020-206079 filed on Dec. 11, 2020, the contents of which are incorporated herein by reference.

REFERENCE SIGNS LIST

11 Building unit
13 Power supply unit
15 Controller
17 Torch
19 Welding robot
21 Filler material supply unit
25 Base plate
31 Input unit
33 Model setting unit
35 Deposition planning unit
37 Storage unit
39 Communication unit
41 Control unit
43, 47 Display unit
45 Bead layer
51 Input unit
53 Display unit
55 Display data generating unit
61,63 Plane
65 Bottom line
67 Top line
69, 71 Side line
73 Overlapping portion
100 Additive manufacturing device
200 Model display device
M Filler material
PC External computer
BM0 Rectangular bead model
BM Trapezoidal bead model
BMR Bead model
BMRs Bead model
B Weld bead
BL Layer

The invention claimed is:

1. An additive manufacturing method for manufacturing an additively-manufactured object by depositing weld beads on a base, the weld beads being formed by melting and solidifying a filler material, the additive manufacturing method comprising:

reading a three-dimensional shape data of the additively-manufactured object;

dividing a three-dimensional model shape based on the three-dimensional shape data into a plurality of layers, and dividing each divided layer into a plurality of bead models corresponding to a bead shape of the weld bead; and depositing the weld beads by repeating a process of forming the weld bead along the divided bead models from a bottom layer to a top layer of the plurality of layers, wherein each of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and the dividing into the plurality of bead models includes in the same layer, the bead model corresponding to a previously formed weld bead and the bead model corresponding to a subsequently formed weld bead that is adjacent to the previously formed weld bead are arranged so as to have an overlapping portion, and among four vertices of the bead model for the subsequently formed weld bead, selecting a particular vertex, the particular vertex positioned at an end of the bottom line of the bead model, the end being away from the overlapping portion, and rotating the other three vertices about the selected vertex to change a shape of the bead model for the subsequently formed weld bead.

2. The additive manufacturing method according to claim 1, wherein rotation angles for rotating the other three vertices are set based on a welding condition of the weld bead or a formation trajectory of the weld bead.

3. The additive manufacturing method according to claim 1, wherein rotation angles for rotating the other three vertices are made different for each of the vertices.

4. The additive manufacturing method according to claim 2, wherein the rotation angles for rotating the other three vertices are made different for each of the vertices.

5. The additive manufacturing method according to claim 1, wherein rotation angles for rotating the other three vertices are set based on a predetermined arithmetic expression.

6. The additive manufacturing method according to claim 2, wherein the rotation angles for rotating the other three vertices are set based on a predetermined arithmetic expression.

7. The additive manufacturing method according to claim 3, wherein the rotation angles for rotating the other three vertices are set based on a predetermined arithmetic expression.

8. The additive manufacturing method according to claim 4, wherein the rotation angles for rotating the other three vertices are set based on a predetermined arithmetic expression.

9. The additive manufacturing method according to claim 5, wherein the arithmetic expression is a linear or curved relational expression in which a coordinate value along the bottom line of the bead model is variable.

10. The additive manufacturing method according to claim 6, wherein the arithmetic expression is a linear or curved relational expression in which a coordinate value along the bottom line of the bead model is variable.

11. The additive manufacturing method according to claim 7, wherein the arithmetic expression is a linear or curved relational expression in which a coordinate value along the bottom line of the bead model is variable.

12. The additive manufacturing method according to claim 8, wherein the arithmetic expression is a linear or curved relational expression in which a coordinate value along the bottom line of the bead model is variable.

13. The additive manufacturing method according to claim 1, wherein a dripping portion that is a downward dripping of a melt of the filler material is provided at one end or both ends of the bottom line of the bead model that is arranged on an upper layer than the bead model arranged on the lowest layer.

14. The additive manufacturing method according to claim 13, wherein the dripping portion is triangular.

15. The additive manufacturing method according to claim 2, wherein a dripping portion that is a downward dripping of a melt of the filler material is provided at one end or both ends of the bottom line of the bead model that is arranged on an upper layer than the bead model arranged on the lowest layer.

16. An additive manufacturing method for manufacturing an additively-manufactured object by depositing weld beads on a base, the weld beads being formed by melting and solidifying a filler material, the additive manufacturing method comprising:

reading a three-dimensional shape data of the additively-manufactured object;

dividing a three-dimensional model shape based on the three-dimensional shape data into a plurality of layers, and dividing each divided layer into a plurality of bead models corresponding to a bead shape of the weld bead; and depositing the weld beads by repeating a process of forming the weld bead along the divided bead models from a bottom layer to a top layer of the plurality of layers, wherein at least one of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and the dividing into the plurality of bead models includes in the same layer, the bead model corresponding to a previously formed weld bead and the bead model corresponding to a subsequently formed weld bead that is adjacent to the previously formed weld bead are arranged to have an overlapping portion, wherein instead of the trapezoidal shape, the bead model for the subsequently formed weld bead is set to a shape with five vertices, the five vertices including:

a vertex positioned at an end of the bottom line of the bead model for the subsequently formed weld bead, the end being away from the overlapping portion, a pair of vertices positioned at both ends of the top line of the bead model for the subsequently formed weld bead, an intersection point between the side line of the bead model for the subsequently formed weld bead on the overlapping portion side and an outer peripheral edge of the bead model for the previously formed weld bead, and a vertex positioned at an end of a bottom line of the bead model for the previously formed weld bead on the overlapping portion side, and among the five vertices of the bead model for the subsequently formed weld bead, selecting a particular vertex, the particular vertex positioned at the end of the bottom line of the bead model that is away from the overlapping portion, and rotating the other four vertices about the selected vertex to change a shape of the bead model for the subsequently formed weld bead.

17. An additive manufacturing device for manufacturing an additively-manufactured object by depositing weld beads on a base, the weld beads being formed by melting and solidifying a filler material, the additive manufacturing device comprising:

a controller configured to read a three-dimensional shape data of the additively-manufactured object; and divide a three-dimensional model shape based on the three-dimensional shape data into a plurality of layers, and divide each divided layer into a plurality of bead models corresponding to a bead shape of the weld bead; and a building machine configured to deposit the weld bead by repeating a process of forming the weld bead along the divided bead models from a bottom layer to a top layer of the plurality of layers, wherein each of the bead models has a trapezoidal shape, and in a cross section vertical to a bead longitudinal direction, a bottom line on the base side and a top line on a side opposite to the base side are parallel to each other, and a pair of side lines that are opposite to each other in an arrangement direction of the bead models arranged in the same layer are non-parallel to each other, and the controller is configured to arrange the bead model corresponding to a previously formed weld bead and the bead model corresponding to a subsequently formed weld bead that is adjacent to the previously formed weld bead in the same layer so as to have an overlapping portion, and among four vertices of the bead model for the subsequently formed weld bead, the controller is configured to select a particular vertex, the particular vertex positioned at an end of the bottom line of the bead model, the end being away from the overlapping portion, and rotate the other three vertices about the selected vertex to change a shape of the bead model for the subsequently formed weld bead.

18. The additive manufacturing device according to claim 17, further comprising:

a display configured to display information of the bead model whose shape is changed by the controller.

19. A model display device, comprising:

an input configured to receive information of the bead model set by the controller of the additive manufacturing device according to claim 17; and a display configured to display the input information of the bead model.

20. The model display device according to claim 19, further comprising:

a display data generator configured to receive information of an adjustment instruction for the bead model from the input, adjust the bead model based on the received information of the adjustment instruction, and output display data of the adjusted bead model to the display.

* * * * *